United States Patent [19]

Scholz et al.

[11] 4,273,359
[45] Jun. 16, 1981

[54] DEFORMATION MEMBER ARRANGED IN THE IMPACT AREA OF THE KNEE

[75] Inventors: Hansjürgen Scholz, Echterdingen; Hans-Gerd Backhaus, Stuttgart; Luigi Brambilla, Böblingen, all of Fed. Rep. of Germany

[73] Assignee: Daimler-Benz AG, Stuttgart, Fed. Rep. of Germany

[21] Appl. No.: 105,706

[22] Filed: Dec. 20, 1979

Related U.S. Application Data

[63] Continuation of Ser. No. 1,165, Jan. 5, 1979, which is a continuation of Ser. No. 768,344, Feb. 14, 1977.

[30] Foreign Application Priority Data

Feb. 19, 1976 [DE]  Fed. Rep. of Germany ....... 2606640

[51] Int. Cl.³ ............................................. B60R 21/08
[52] U.S. Cl. .................................... 280/740; 188/1 C; 280/751
[58] Field of Search ............... 280/728, 743, 748, 749, 280/752, 751, 753, 730, 740; 188/1 C; 293/107; 428/182

[56] References Cited

U.S. PATENT DOCUMENTS

| 1,331,359 | 2/1920 | Parrott | 280/743 |
|---|---|---|---|
| 1,724,431 | 8/1929 | Spear | 293/107 |
| 3,113,788 | 12/1963 | Johnston | 180/90 |
| 3,425,712 | 2/1969 | Berryman | 280/739 |
| 3,439,769 | 4/1969 | Brilmyer | 280/752 |
| 3,638,992 | 2/1972 | Forshee | 280/748 |
| 3,642,303 | 2/1972 | Irish | 280/730 |
| 3,784,225 | 1/1974 | Fleck | 280/729 |
| 3,792,873 | 2/1974 | Buchner | 280/743 |
| 3,817,553 | 6/1974 | Wilfert | 280/752 |
| 3,947,056 | 3/1976 | Schwanz | 180/90 |
| 3,968,979 | 7/1976 | Schiesterl | 280/734 |
| 3,974,313 | 8/1976 | James | 428/182 |
| 3,979,139 | 9/1976 | Hoffmann | 280/751 |
| 4,000,341 | 12/1976 | Matson | 428/182 |
| 4,050,326 | 9/1977 | Köpf | 188/1 C |

FOREIGN PATENT DOCUMENTS

| 2318664 | 10/1974 | Fed. Rep. of Germany | 280/752 |
|---|---|---|---|
| 2335958 | 1/1975 | Fed. Rep. of Germany | 280/751 |
| 2227745 | 11/1974 | France | 280/750 |

Primary Examiner—John P. Silverstrim
Attorney, Agent, or Firm—Craig and Antonelli

[57] ABSTRACT

An impact absorbing device constructed as a hollow body member and extending in a vehicle transverse direction within in an impact area of knees of a driver and co-driver of a motor vehicle. The impact absorbing device has an impact engaging surface facing the knees, with the surface having a rounded-off cross sectional profile and vertically extending corrugations so that the member yields only locally upon engagement by the knees.

19 Claims, 6 Drawing Figures

DEFORMATION MEMBER ARRANGED IN THE IMPACT AREA OF THE KNEE

This is a continuation of application Ser. No. 1,165, filed Jan. 5, 1979 which is a continuation of Ser. No. 768,344, filed Feb. 14, 1977.

The present invention relates to a deformation member and, more particularly, to an impact absorbing device which is constructed as hollow body and extends in the vehicle transverse direction within the impact area of the knees of the driver and of the passenger seated alongside the driver of a motor vehicle, especially of a passenger motor vehicle, which possesses on the side facing the vehicle leg space, a rounded-off cross-sectional profile.

Such a deformation member which in the case of an impact prevents, together with the known retention system, a submerging of the passenger into the foot or leg space, is known from the German Offenlegungsschrift 2,151,599. It is possible by a corresponding fashioning and dimensioning of the body preferably consisting of sheet metal to keep the forces necessary for the deformation within a predetermined limit precluding injuries. However, disadvantageous with such hollow sheet metal bodies is their relatively high weight, since for purposes of catching and decelerating the knees, as a rule only a slight depth dimension exists, which leads to relatively high material thicknesses of the deformation member. From this fact a further disadvantage can be deduced since such sheet metal members have a relatively hard surface. For that reason, in case of an impact, it cannot be precluded with certainty that at least at the beginning of the deformation phase, the maximum permissible load of the knee area will be exceeded for a short period of time.

It is the aim of the present invention to indicate an approach, by means of which injuries of the knees are precluded with certainty during each phase of the impact.

Consequently, a deformation member constructed as hollow body, extending in the vehicle transverse direction and arranged within the impact area of the knees of the drive and of the co-driver of a motor vehicle, especially of a passenger motor vehicle, is proposed which has a rounded-off cross-sectional profile on the side facing of the vehicle leg space, whereby according to the present invention the impact-engaging surface of the deformation member is equipped with only a locally yielding structure. A lateral sliding-off of the knees is precluded thereby by the local indenting combined with a high absorption capacity.

In a preferred embodiment of the present invention, at least the impact-engaging surface of the deformation member has a shape undulated in the manner of a corrugated tube. The thus-created grooves are locally pulled plain or smooth in case of an impact under energy absorption.

However, it is also possible that the impact-engaging surface forms the cover layer of a deformation zone realized in the manner of a sandwich construction. A relatively thick elastic, synthetic resinous layer may adjoin this cover layer, which is mounted on the deformation base body. This construction produces a distribution of the load over a larger surface so that the material strength and thickness of the base body can be correspondingly reduced.

A reduction of the material thickness of the hollow body walls is also made possible if by application of laterally arranged covers, an altogether gas-tight closed-off hollow space is created. During the immersion of the knees into the deformation member, the interior pressure thereof increases, as a result of which an increased load capacity is established.

It is additionally of advantage if the hollow space is filled with a gas that is under an atmospheric excess pressure. As a result thereof, the load capacity component produced by the interior pressure increases, which under certain prerequisites leads to a better utilization of the available deformation path.

In a preferred embodiment of the present invention, the excess pressure is built up only during the triggering of a sensor responding to certain criteria. If the triggering threshold of the sensor is thereby determined correspondingly, then it is possible to construct the hollow body relatively soft and to achieve a particularly soft immersion of the knee at low impact velocities. The interior pressure increases only at higher impact velocities and with a triggered sensor owing to the inflowing gas, and as a result thereof, the load capacity of the hollow body increases correspondingly. One obtains as a result of these measures an automatic adaptation of the knee protection to the accident gravity.

It is possible according to a further feature of the present invention to conduct the gases back through a channel disposed outside of the impact engaging surface, which is provided with openings directed toward the hollow space and adapted to be closed, for example, by a check valve flap of flexible material.

It may thereby be of advantage to form the channel by a partition wall extending inside of the hollow space or to mount the channel externally on the deformation member.

Finally, it is also possible, especially on the co-driver side, to provide the channel with openings directed toward the head space of the vehicle, through which the gas passes over in case of need into an inflatable bag serving for the catching and absorbing of the upper body of a passenger.

In order that the interior pressure cannot increase uncontrollably, it is advantageous to decrease the same in a predetermined manner after reaching a predetermined value by way of at least one discharge opening. This discharge opening might be closed off, for example, during the normal driving operation by a conventional bursting diaphragm.

Accordingly, it is an object of the present invention to provide a deformation member arranged within the impact area of the knees of the driver and co-driver in a motor vehicle, which avoids by simple means the aforementioned shortcomings and drawbacks encountered in the prior art.

Another object of the present invention resides in a deformation member arranged within the impact area of the knees of the driver and co-driver of a passenger motor vehicle, which eliminates the need for relatively great material thicknesses on the part of the deformation member and for a relatively great weight thereof.

A further object of the present invention resides in a deformation member arranged within the impact area of the knees within a motor vehicle, especially in a passenger motor vehicle, which assures with certainty that the maximum permissive loads of the knee area are not exceeded at any time during the deformation phase.

A still further object of the present invention resides in a deformation member of the type described above, by means of which injuries of the knees of the driver and of the passenger seated alongside the driver are avoided during every phase of the impact.

Another object of the present invention resides in a deformation member of the type described above which permits the use of reduced material thicknesses as regards the hollow body walls of the deformation member, yet enables a better utilization of the available deformation path.

Still another object of the present invention resides in a deformation member arranged within the impact area of the knees of a passenger motor vehicle which permits an automatic adaptation of the knee protection to the seriousness of the accident.

These and other objects, features and advantages of the present invention will become more apparent from the following description when taken in connection with the accompanying drawing which shows, for purposes of illustration only, several embodiments in accordance with the present invention, and wherein.

Figure 1:
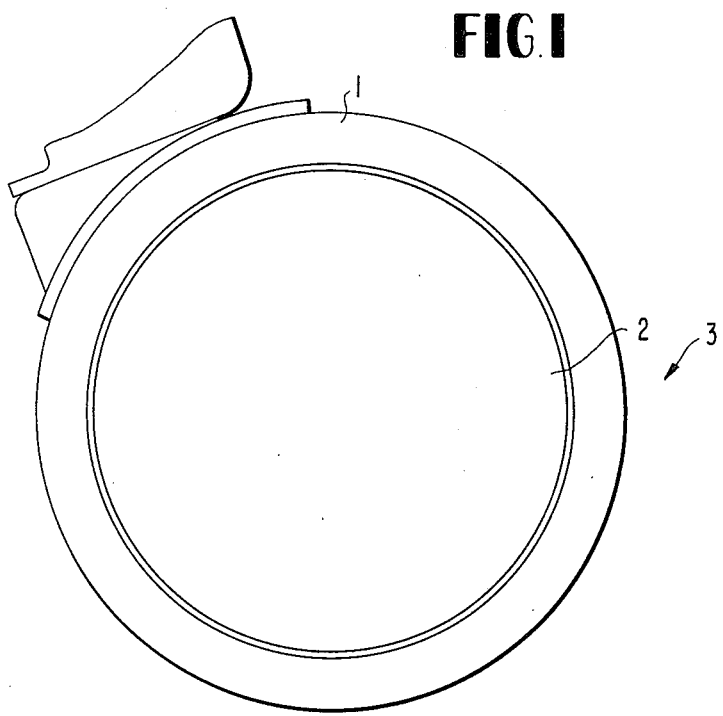
FIG. 1 is a somewhat schematic cross-sectional view through a deformation member according to the present invention which is constructed as corrugated tubing.
Figure 2:
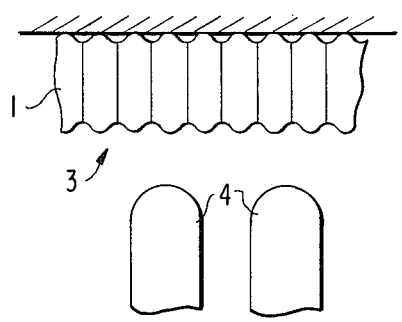
FIG. 2 is a somewhat schematic simplified plan view on the deformation member according to FIG. 1 prior to the occurrence of a deformation.
Figure 3:
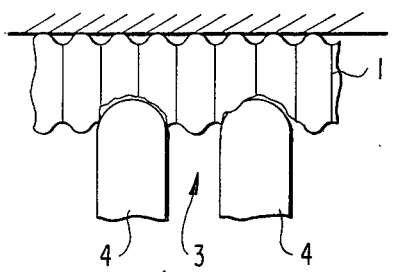
FIG. 3 is a somewhat schematic simplified plan view on the deformation member according to FIG. 1 during a knee impact.

Referring now to the drawing wherein like reference numerals are used throughout the various views to designate like parts, the deformation member 1 illustrated in FIGS. 1 to 3 has a corrugated or undulated construction and is closed off against the outside in a gas-tight manner by laterally arranged covers 2 (FIG. 1). An impact-engaging surface generally designated by reference numeral 3—indicated also in FIGS. 2 and 3—which represents a part of the deformation member 1, is disposed opposite the knees 4 of a passenger (not shown). In case of an impact, the knees 4 plunge or immerse according to FIG. 3 into the deformation body 1 which is thereby locally pressed-in under energy absorption, whereby the corrugated or undulated structure flattens out.

Figure 4:
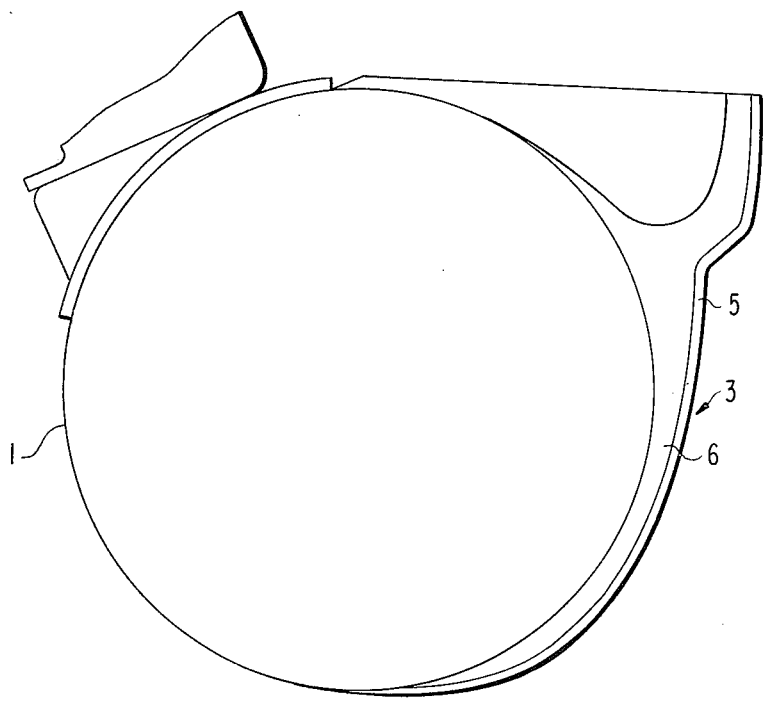
FIG. 4 is a schematic transverse cross-sectional view through a modified deformation member in accordance with the present invention with an impact zone constructed according to the sandwich principle.

In the embodiment according to FIG. 4, the impact-engaging surface generally designated by reference numeral 3 is formed by the cover layer 5 of a deformation zone constructed according to the sandwich principle, whereby a relatively thick impact-distribution-layer 6 adjoins the cover layer 5.

Figure 5:
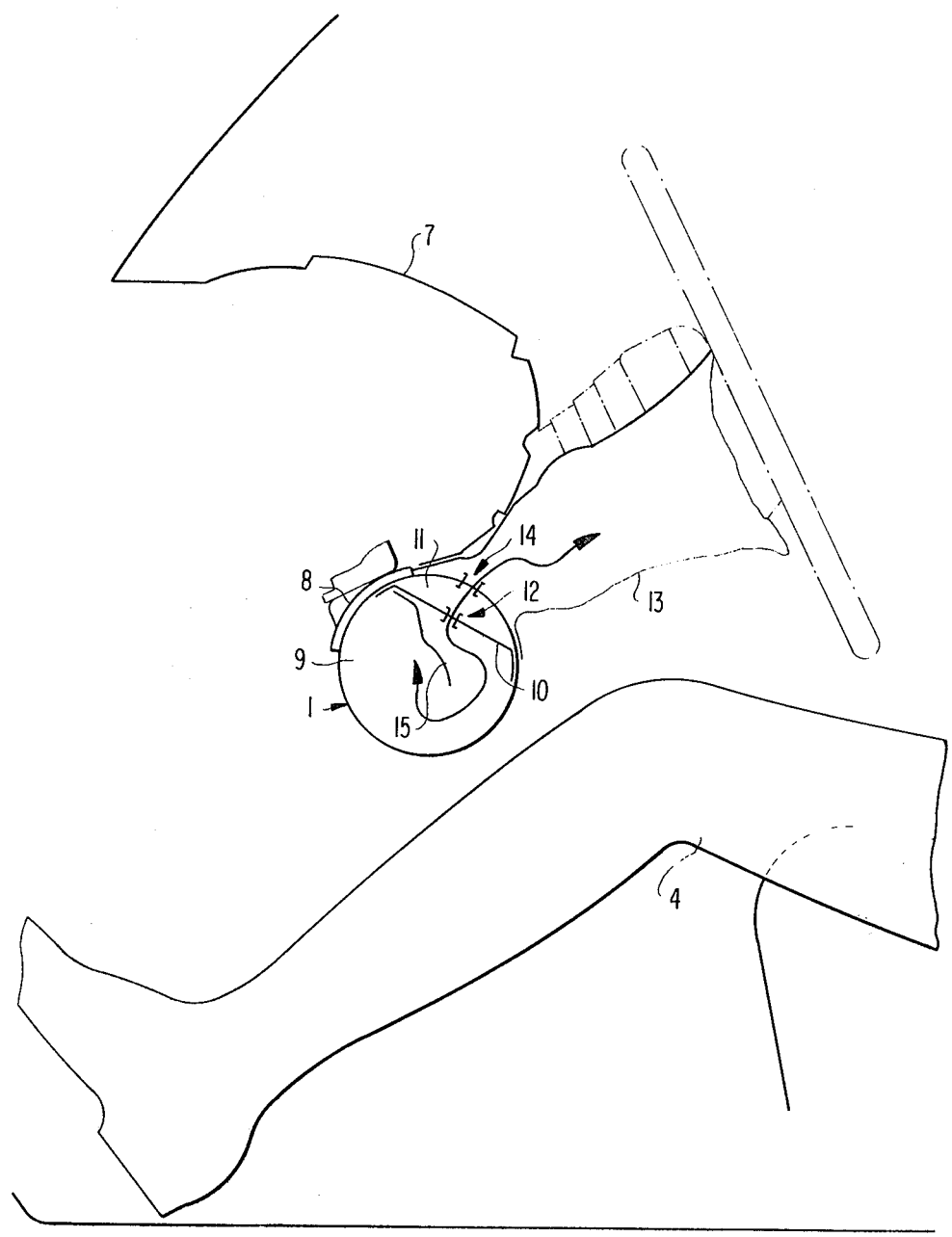
FIG. 5 is a schematic cross-sectional view through an overall installation of a deformation member equipped with an integrated gas-conduction channel according to the present invention within a motor vehicle.

The arrangement of a deformation member 1 according to the present invention in a passenger motor vehicle, not illustrated in detail, is shown in FIG. 5. The deformation member generally designated by reference numeral 1 which is secured at a fixed vehicle part (not shown) by means of a bracket 8, within the impact area of the knees 4 in the lower section of the instrument panel 7, includes a partition wall 10 inside of its hollow space 9, by means of which a channel 11 is produced. Propellant gases can be introduced into this channel from a pressure medium source in case of a danger, for example, triggered by a sensor, whereby the propellant gases pass over into the hollow space 9 through openings 12.

These gases may be used thereby at the same time for unfolding a bag 13 on the co-driver side, which inflates in the direction toward the head space and which catches and absorbs the chest-and head-area of the passenger, when the outer cover of the deformation member 1 includes openings 14 arranged correspondingly. Since the pressure in the bag 13 is to be controllably reduced; whereas the pressure in the hollow space 9 is not intended to be reduced as a rule, a check valve flap 15 is provided which closes automatically the openings 12 after the pressure build-up.

Figure 6:
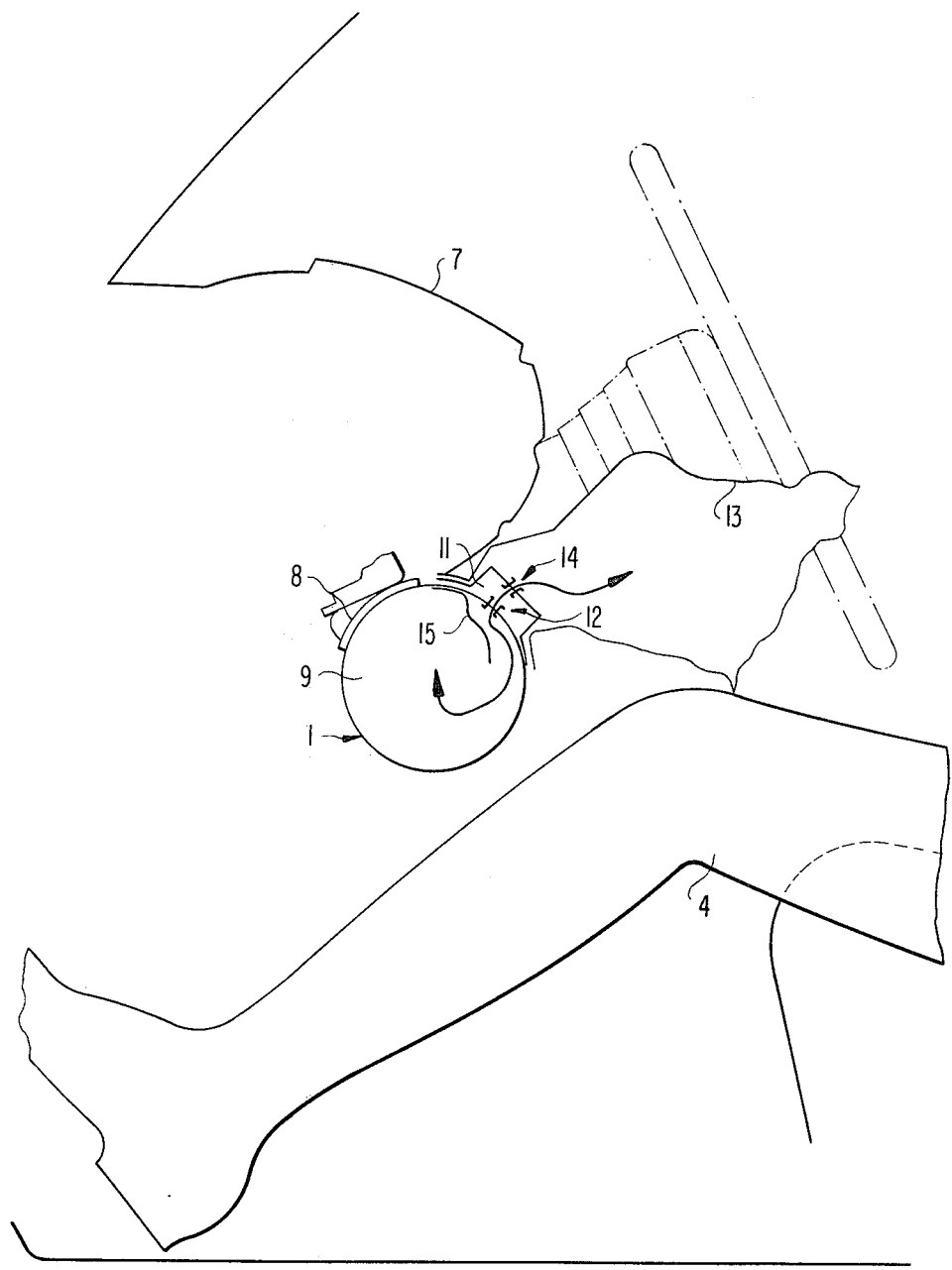
FIG. 6 is a schematic cross-sectional view similar to FIG. 5 of a modified embodiment of a deformation member in a motor vehicle provided with a channel mounted on the deformation member.

The embodiment according to FIG. 6 corresponds far-reachingly to that according to FIG. 5 so that the same reference numerals are used for similar parts. In contrast to the integrated channel 11 in FIG. 5, the channel 11 according to FIG. 6 is mounted on the deformation member 1.

The subject matter of the present invention is not limited only to the application thereof in the illustrated and described embodiments. For example, it would also be possible to provide a gas inlet at an end face of the knee protection.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An impact absorbing device for engagement by knees of an occupant of a vehicle during collision, the device comprising a plastically deformable, hollow body member extending in a vehicle transverse direction, said member having an impact engaging surface facing said knees, said surface having a rounded-off cross sectional profile and vertically extending corrugations whereby said member yields only locally upon engagement by said knees.

2. An impact absorbing device according to claim 1, wherein a deformation zone is provided which includes an impact distribution layer arranged between an outer surface of the hollow body member and a cover layer of the deformation zone.

3. An impact absorbing device according to claim 1, wherein laterally arranged cover means are mounted on respective ends of the hollow body member for producing a closed-off hollow space.

4. An impact absorbing device according to claim 3, wherein the hollow space is filled with a gas that is under a pressure in excess of atmospheric pressure.

5. An impact absorbing device according to claim 4, wherein at least one discharge opening means is provided for intentionally reducing the interior pressure in a predetermined manner after reaching a predetermined value.

6. An impact absorbing device according to claim 4, wherein an excess pressure is built up in the hollow space only upon triggering of a sensor means responding to predetermined criteria.

7. An impact absorbing device according to claim 6, wherein a channel means is located outside of the impact engaging surface and is provided with openings directed toward the hollow space, said channel means being adapted to supply the gas to the hollow space.

8. An impact absorbing device according to claim 7, wherein means are provided for closing off said last-mentioned openings after a predetermined pressure build-up in the hollow space.

9. An impact absorbing device according to claim 8, wherein said means for closing off said openings include check valve flap means of a flexible material.

10. An impact absorbing device according to claim 8, wherein a partition means extends inside of the hollow space for forming the channel means.

11. An impact absorbing device according to claim 8, wherein the channel means is mounted on the hollow body member.

12. An impact absorbing device according to claim 8, wherein openings directed toward a head space of the vehicle are provided in the channel means through which the gas passes over into an inflatable bag serving for absorbing an upper body of a passenger of the motor vehicle.

13. An impact absorbing device according to claim 12, wherein at least one discharge opening means is provided for intentionally reducing the inerior pressure in a predetermined manner after reaching a predetermined value.

14. An impact absorbing device according to claim 13, wherein a deformation zone is provided which includes an impact distribution layer arranged between an outer surface of the hollow body member and a cover layer of the deformation zone.

15. An impact absorbing device according to claim 1, wherein a channel means is located outside of the impact engaging surface and is provided with openings directed toward the hollow space, said channel means being adapted to supply a gas to the hollow space.

16. An impact absorbing device according to claim 15, wherein means are provided for closing off said openings after a predetermined pressure build-up in the hollow space by check valve flap means of a flexible material.

17. An impact absorbing device according to claim 15, wherein a partition means extends inside the hollow space for forming the channel means.

18. An impact absorbing device according to claim 15, wherein the channel means is mounted on the hollow body member.

19. An impact absorbing device according to claim 15, wherein openings directed toward a head space of the vehicle are provided in the channel means through which the gas passes over into an inflatable bag serving for absorbing an upper body of a passenger of the motor vehicle.

* * * * *